United States Patent [19]

Gross et al.

[11] 4,084,223

[45] Apr. 11, 1978

[54] CONTROL UNIT

[75] Inventors: Hans Gross, Neunkirchen a. Brand, Germany; Eugenio Berti, Milan, Italy

[73] Assignee: Siemens Aktiengesellschaft, Munich, Germany

[21] Appl. No.: 684,499

[22] Filed: May 10, 1976

[30] Foreign Application Priority Data

Jun. 4, 1975 Germany .............................. 2524869

[51] Int. Cl.² .......................................... H02M 7/155
[52] U.S. Cl. ..................................... 363/129; 363/161
[58] Field of Search ................. 318/227; 321/5, 69 R, 321/18; 363/160, 161, 162, 129

[56] References Cited

U.S. PATENT DOCUMENTS

| 3,465,234 | 9/1969 | Phadke .............................. 321/18 X |
| 3,467,850 | 9/1969 | Christian et al. ...................... 321/18 |
| 3,821,632 | 6/1974 | Rylicki ............................... 321/18 X |
| 3,825,814 | 7/1974 | Pelly ................................. 321/18 X |

*Primary Examiner*—William M. Shoop
*Attorney, Agent, or Firm*—Kenyon & Kenyon, Reilly, Carr & Chapin

[57] ABSTRACT

A control unit for a six-pulse reversing (two-quadrant) thyristor converter is disclosed. More particularly, a first integrator is provided for generating a sawtooth voltage for controlling the thyristors associated with all negative half-waves of the applied phase voltage, and a second integrator is provided for generating a sawtooth voltage for controlling the thyristors associated with all positive half-waves of the phase voltages. Additionally, an evaluation circuit is provided which is responsive to the zero crossings and polarities of the phase voltages and which controls the integrations of the integrators so that they start and end above and below respective first and second predetermined limits.

3 Claims, 4 Drawing Figures

CONTROL UNIT

BACKGROUND OF THE INVENTION

1. Field of the Invention

This invention relates to a control unit for thyristors of a cycloconverter supplied by a three phase network and, in particular, to a control unit of the type in which a sawtooth voltage is generated in dependence on the zero crossing of a phase voltage and, in which, a firing command is generated for the thyristors when the sawtooth voltage agrees with a control voltage.

2. Description of the Prior Art

Control units of the aforesaid type in which integrators are employed to generate the sawtooth voltage are known, for example, from German Auslegeschrift 2,119,525. In these known arrangements, a separate integrator is provided for generating the sawtooth wave corresponding to each phase voltage and to each polarity of the half-waves of each phase voltage. In addition to requiring complex circuiting, the use of separate integrators also requires in each case an adjustment of the integrators to the same characteristic by means of potentiometers when the control is started up.

It is an object of the present invention to provide a control unit of the above type in which as few integrators as possible are required.

SUMMARY OF THE INVENTION

In accordance with the principles of the present invention, the above an other objects are realized in a circuit of the above type by providing a first integrator for generating a sawtooth voltage for controlling the thyristors associated with all negative half-waves of the phase voltages, and a second integrator for generating a sawtooth voltage for controlling the thyristors associated with all positive half-waves of the phase voltages. Additionally, an evaluation logic circuit is provided which is responsive to the polarity and the zero crossings of the phase voltages or of an auxiliary system derived therefrom, for controlling the integrations performed by the integrators so that the integrations start at a point above a first predetermined limit (the converter rectifier limit) and end at a point below a second predetermined limit (the inverter drop-out limit). In this manner, fewer integrators are required and the further advantage is realized in that only two integrators need to be adjusted.

More particularly, the evaluation logic determines the starting point of a particular phase voltage in each half-wave by means of the zero crossing of another phase voltage and the polarities of the remaining phase voltages, and the end point of the particular phase voltage by means of the zero crossing of the respective half-wave of the particular phase voltage and the polarities of the remaining phase voltages. The phase voltages themselves can also be replaced by the voltages of an auxiliary system derived therefrom.

BRIEF DESCRIPTION OF THE DRAWINGS

The above and other features and aspects of the present invention wll become more apparent upon reading the following detailed description in conjunction with the accompanying drawings, in which.

DETAILED DESCRIPTION

Figure 1:
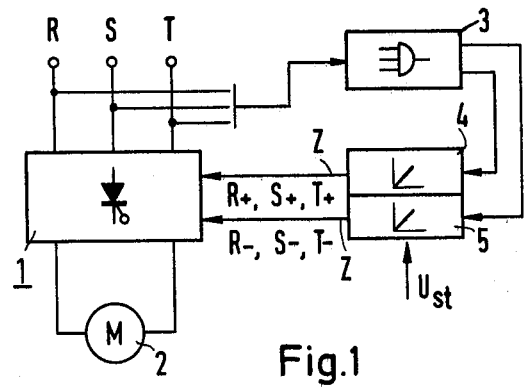
FIG. 1 shows a block diagram of a control unit in accordance with the invention.

In FIG. 1, a d-c motor 2 is connected to the phase voltages R, S, T of a three-phase network via a conventional 6-or more-pulse reversing (2-quadrant) thyristor converter 1 having thyristors arranged in a bridge circuit. The converter 1 is controlled to operate such that at the beginning of each possible control period for the phase voltages, a respective sawtooth voltage is started for the thyristors corresponding to the phase voltages and such that a respective firing pulse Z is given to the thyristors which are associated with the half-wave in question, when their respective sawtooth voltage agrees with a control voltage $U_{st}$.

In accordance with the principles of the present invention, two integrators 4 and 5, respectively, are provided for generating the sawtooth voltages for all positive half-waves (R+, T+, S+) and for all negative half-waves (R−, T−, S−) of the phase voltages R, S, T. The starting point and the end point, i.e., the resetting to zero, in turn, are determined for each integrator by an evaluation logic circuit 3 from the phase voltages R, S, T or an auxiliary rotating-field system derived therefrom.

Figure 2A:
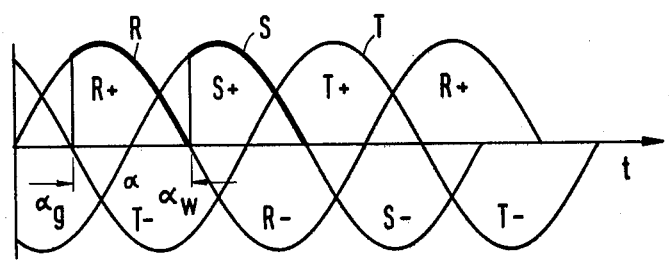
FIG. 2a illustrates the phase voltages applied to the control unit of FIG. 1.
Figure 2B:
FIG. 2b shows the starting and end points of the sawtooth integration of the integrators of the control unit of FIG. 1.
Figure 2C:
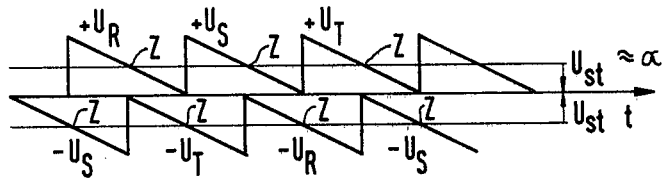
FIG. 2c shows the sawtooth voltages generated by the integrators of the control unit of FIG. 1.

FIG. 2b shows the determination by the logic circuit 3 of the individual starting instants U' of the individual sawtooth voltages as a function of the logic conditions of the phase voltages, and FIG. 2c, the individual sawtooth voltages $U_R$, $U_S$, $U_T$ for the positive half-waves and the individual sawtooth voltages $-U_R$, $-U_S$, $-U_T$ for the negative half-waves of the voltages R, S and T. As is evident, the starting point, for example, in the half-wave +R, is at 30° (referred to the three-phase system, at 60°), i.e., is above a predetermined first limit $\alpha_g$ (the rectifier limit), and the end point is at 180° (referred to the three-phase system, at 210°), i.e., is below a second predetermined limit $\alpha_w$ (the inverter drop-out limit). Thus, a definite control angle $\alpha$ between $\alpha_g$ and $\alpha_w$ is obtainable which depends on the choice of the control voltage $U_{st}$. Through limitation to this control range (between $\alpha_g$ and $\alpha_w$), which is entirely sufficient for most purposes of motor control, only two integrators are necessary for all half-waves.

The circuit of the invention can be used for 1-quadrant operation of a converter as well. In such case, the auxiliary rotating field must be shifted accordingly.

What is claimed is:

1. A control unit for controlling the operation of thyristors of a converter, said thyristors being adapted to be responsive to a three-phase network supplying three-phase voltages, the control unit comprising:
    a first integrator for providing a sawtooth voltage for use in control of the thyristors associated with the positive half-waves of said phase voltages;
    a second integrator for providing a sawtooth voltage for use in control of the thyristors associated with the negative half-waves of said phase voltages;
    and evaluation logic circuit means responsive to the polarities and zero crossings of the phase voltages for controlling the integration performed by each of said integrators during each of the half-waves of a particular phase voltage associated with that integrator so that the integration starts at a point determined by the zero crossing of one of the phase voltages other than said particular phase voltage and by the polarities of the phase voltages other than said one phase voltage and ends at a point determined by the zero crossing of said particular phase voltage and the polarities of the phase voltages other than said particular phase voltage.

2. A control unit in accordance with claim 1 in which: said starting point corresponds to a first phase angle; and said end point corresponds to a second phase angle.

3. A control unit in accordance with claim 1 in which: said starting point is at the converter rectifier limit; and said end point is at the inverter drop-out limit.

* * * * *